United States Patent
Edmondson et al.

(10) Patent No.: US 8,341,358 B1
(45) Date of Patent: *Dec. 25, 2012

(54) SYSTEM AND METHOD FOR CLEANING DIRTY DATA IN A CACHE VIA FRAME BUFFER LOGIC

(75) Inventors: John H. Edmondson, Arlington, MA (US); James Roberts, Austin, TX (US)

(73) Assignee: NVIDIA Corporation, Santa Clara, CA (US)

( * ) Notice: Subject to any disclaimer, the term of this patent is extended or adjusted under 35 U.S.C. 154(b) by 516 days.

This patent is subject to a terminal disclaimer.

(21) Appl. No.: 12/562,989

(22) Filed: Sep. 18, 2009

(51) Int. Cl.
*G06F 13/00* (2006.01)

(52) U.S. Cl. ........ 711/144; 711/122; 711/133; 711/134; 711/135; 711/141

(58) Field of Classification Search .................. 711/122, 711/133–135, 141, 143–144
See application file for complete search history.

(56) References Cited

U.S. PATENT DOCUMENTS

| | | | | |
|---|---|---|---|---|
| 7,231,497 B2 * | 6/2007 | Trika et al. | ..................... | 711/141 |
| 8,001,331 B2 * | 8/2011 | Biles et al. | ..................... | 711/133 |
| 2003/0093626 A1 * | 5/2003 | Fister | ............................ | 711/147 |

\* cited by examiner

*Primary Examiner* — Jasmine Song
(74) *Attorney, Agent, or Firm* — Patterson & Sheridan, LLP (57) ABSTRACT

One embodiment of the invention sets forth a mechanism for efficiently write dirty data from the L2 cache to a DRAM. A dirty data notification, including a memory address of the dirty data, is transmitted by the L2 cache to a frame buffer logic when dirty data is stored in the L2 cache. The frame buffer logic uses a page-stream sorter to organize dirty data notifications based on the bank page associated with the memory addresses included in the dirty data notifications. The page-stream sorter includes multiple sets with entries that may be associated with different bank pages in the DRAM. The frame buffer logic transmits dirty data associated with an entry that has a maximum threshold of dirty data notifications to the DRAM. The frame buffer logic also transmits dirty data associated with the oldest entry when the number of entries in a set reaches a maximum threshold.

20 Claims, 9 Drawing Sheets

SYSTEM AND METHOD FOR CLEANING DIRTY DATA IN A CACHE VIA FRAME BUFFER LOGIC

BACKGROUND OF THE INVENTION

1. Field of the Invention

The present invention relates generally to the field of memory management and, more specifically, to a cache autoclean algorithm and supporting hardware design.

2. Description of the Related Art

One element of a memory subsystem within certain processing units is a Level 2 Cache memory (referred to herein as "L2 cache"). The L2 cache is a large on-chip memory that serves as an intermediate point between an external memory (e.g., frame buffer memory) and internal clients of the memory subsystem (referred to herein as the "clients"). The L2 cache temporarily stores data that the clients are reading from and writing to the external memory (referred to herein as "DRAM").

During a write operation, where a client transmits data that needs to be committed to a DRAM, the data to be written is first transmitted to the L2 cache and is held there until an opportune time to push the data to the DRAM arises. Data present in the data cache is considered "dirty" until the data is written to the DRAM, after which the memory space in the data cache can be cleaned and made available for other data. For systems requiring high data throughput, like graphics systems, writing the dirty data to memory as efficiently as possible is critical to overall system performance. Doing so creates free memory space in the L2 cache for new read/write operations.

As is well known, each block of dirty data in the L2 cache has an associated location within a specific bank page of the DRAM, where the dirty data is written. To optimize memory accesses by mitigating delays resulting from the waiting for DRAM bank pages to pre-charge, the number of write operations from the L2 cache to a particular DRAM bank page at any given time should be maximized.

As the foregoing illustrates, what is needed in the art is a technique to efficiently write dirty data from the L2 cache to the DRAM.

SUMMARY OF THE INVENTION

One embodiment of the present invention sets for a method for cleaning dirty data residing in an intermediary cache that is coupled to one or more clients and to an external memory. The method includes the steps of receiving a dirty data notification from the intermediate cache that includes a memory address indicating a cache line within the intermediary cache in which dirty data associated with the dirty data notification resides, determining a set of bank pages associated with the dirty data notification, determining a first entry within the set of bank pages corresponding to a first bank page within the external memory where the dirty data associated with the dirty data notification should be stored, marking a bit in the first entry as valid, requesting dirty data from the intermediary cache associated with either the first entry or another entry within the set of bank pages for transmission to the external memory, and transmitting the requested dirty data to the external memory for storage.

One advantage of the disclosed method is that the number and duration of halted read and write operations is minimized as frame buffer logic automatically transmits dirty data associated with a particular bank page when the number of cache lines with resident dirty data associated with that bank page reaches a pre-determined threshold value.

BRIEF DESCRIPTION OF THE DRAWINGS

So that the manner in which the above recited features of the present invention can be understood in detail, a more particular description of the invention, briefly summarized above, may be had by reference to embodiments, some of which are illustrated in the appended drawings. It is to be noted, however, that the appended drawings illustrate only typical embodiments of this invention and are therefore not to be considered limiting of its scope, for the invention may admit to other equally effective embodiments.

DETAILED DESCRIPTION

In the following description, numerous specific details are set forth to provide a more thorough understanding of the present invention. However, it will be apparent to one of skill in the art that the present invention may be practiced without one or more of these specific details. In other instances, well-known features have not been described in order to avoid obscuring the present invention.

System Overview

Figure 1:
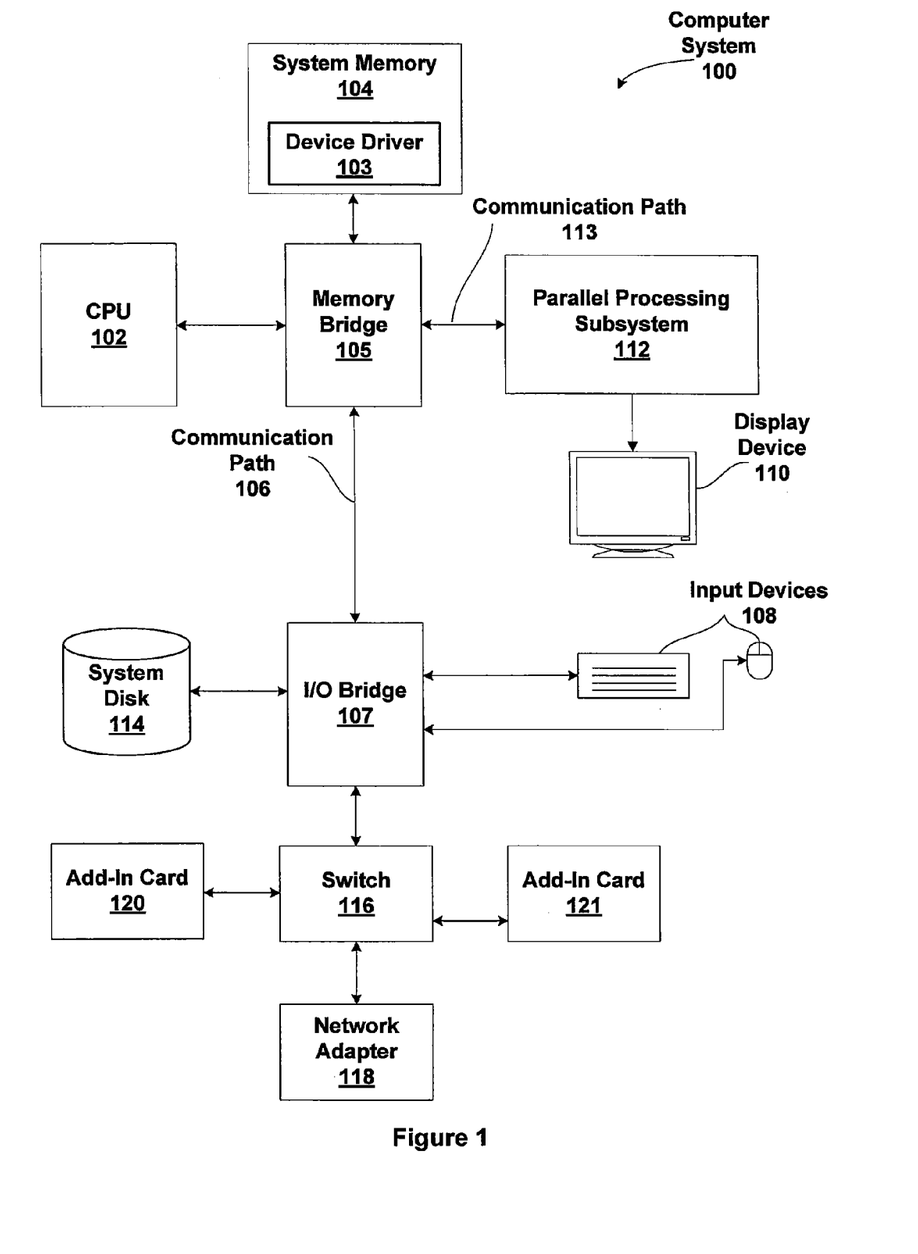
FIG. 1 is a block diagram illustrating a computer system configured to implement one or more aspects of the present invention.

FIG. 1 is a block diagram illustrating a computer system 100 configured to implement one or more aspects of the present invention. Computer system 100 includes a central processing unit (CPU) 102 and a system memory 104 communicating via a bus path that may include a memory bridge 105. Memory bridge 105, which may be, e.g., a Northbridge chip, is connected via a bus or other communication path 106 (e.g., a HyperTransport link) to an I/O (input/output) bridge 107. I/O bridge 107, which may be, e.g., a Southbridge chip, receives user input from one or more user input devices 108 (e.g., keyboard, mouse) and forwards the input to CPU 102 via path 106 and memory bridge 105. A parallel processing subsystem 112 is coupled to memory bridge 105 via a bus or other communication path 113 (e.g., a PCI Express, Accelerated Graphics Port, or HyperTransport link); in one embodiment parallel processing subsystem 112 is a graphics subsystem that delivers pixels to a display device 110 (e.g., a conventional CRT or LCD based monitor). A system disk 114 is also connected to I/O bridge 107. A switch 116 provides connections between I/O bridge 107 and other components such as a network adapter 118 and various add-in cards 120 and 121. Other components (not explicitly shown), including USB or other port connections, CD drives, DVD drives, film recording devices, and the like, may also be connected to I/O bridge 107. Communication paths interconnecting the various components in FIG. 1 may be implemented using any suitable protocols, such as PCI (Peripheral Component Interconnect), PCI Express (PCI-E), AGP (Accelerated Graphics Port), HyperTransport, or any other bus or point-to-point communication protocol(s), and connections between different devices may use different protocols as is known in the art.

In one embodiment, the parallel processing subsystem 112 incorporates circuitry optimized for graphics and video processing, including, for example, video output circuitry, and constitutes a graphics processing unit (GPU). In another embodiment, the parallel processing subsystem 112 incorporates circuitry optimized for general purpose processing, while preserving the underlying computational architecture, described in greater detail herein. In yet another embodiment, the parallel processing subsystem 112 may be integrated with one or more other system elements, such as the memory bridge 105, CPU 102, and I/O bridge 107 to form a system on chip (SoC).

It will be appreciated that the system shown herein is illustrative and that variations and modifications are possible. The connection topology, including the number and arrangement of bridges, may be modified as desired. For instance, in some embodiments, system memory 104 is connected to CPU 102 directly rather than through a bridge, and other devices communicate with system memory 104 via memory bridge 105 and CPU 102. In other alternative topologies, parallel processing subsystem 112 is connected to I/O bridge 107 or directly to CPU 102, rather than to memory bridge 105. In still other embodiments, I/O bridge 107 and memory bridge 105 might be integrated into a single chip. The particular components shown herein are optional; for instance, any number of add-in cards or peripheral devices might be supported. In some embodiments, switch 116 is eliminated, and network adapter 118 and add-in cards 120, 121 connect directly to I/O bridge 107.

Figure 2:
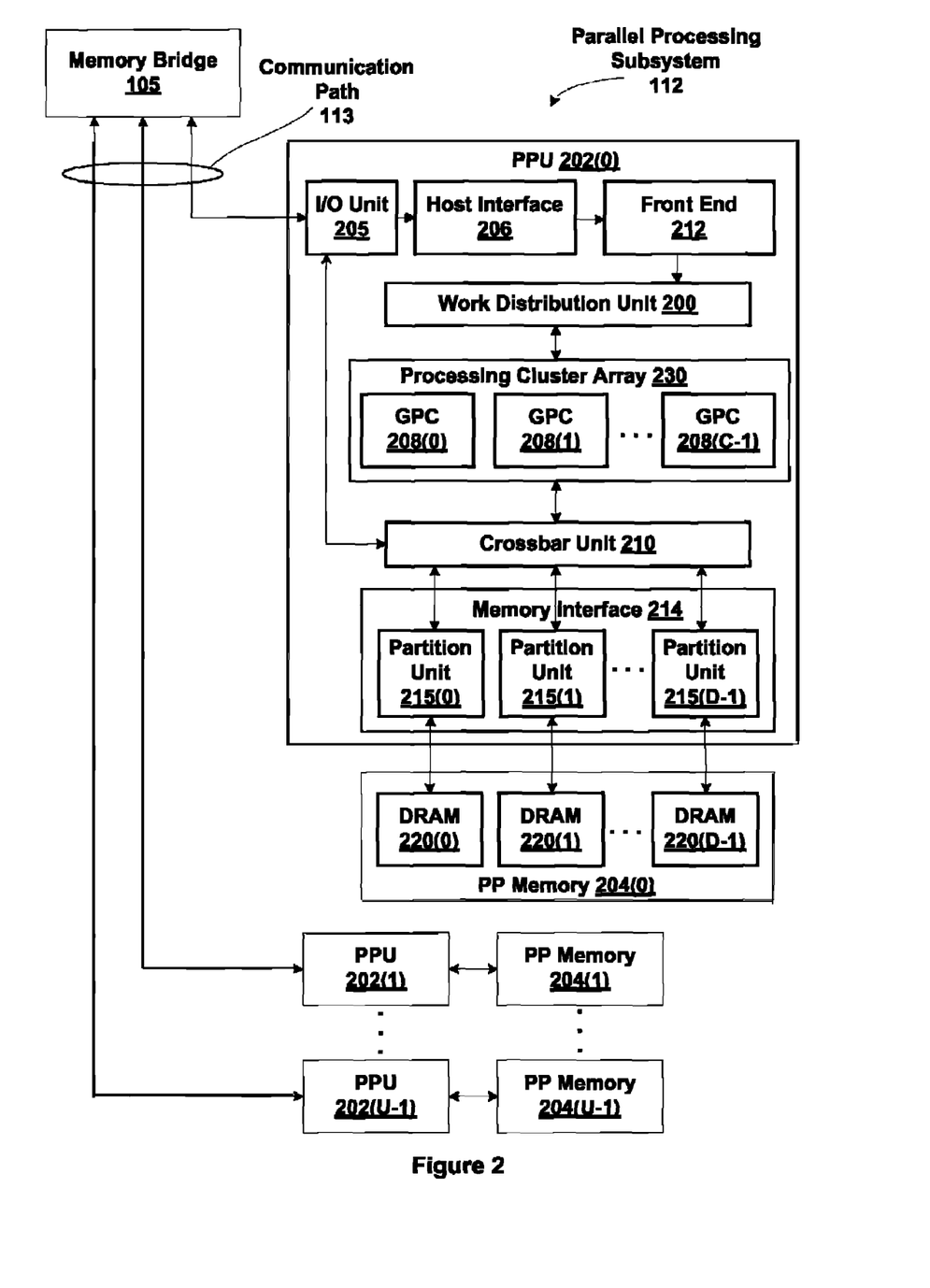
FIG. 2 is a block diagram of a parallel processing subsystem for the computer system of FIG. 1, according to one embodiment of the present invention.

FIG. 2 illustrates a parallel processing subsystem 112, according to one embodiment of the present invention. As shown, parallel processing subsystem 112 includes one or more parallel processing units (PPUs) 202, each of which is coupled to a local parallel processing (PP) memory 204. In general, a parallel processing subsystem includes a number U of PPUs, where U≧1. (Herein, multiple instances of like objects are denoted with reference numbers identifying the object and parenthetical numbers identifying the instance where needed.) PPUs 202 and parallel processing memories 204 may be implemented using one or more integrated circuit devices, such as programmable processors, application specific integrated circuits (ASICs), or memory devices, or in any other technically feasible fashion.

Referring again to FIG. 1, in some embodiments, some or all of PPUs 202 in parallel processing subsystem 112 are graphics processors with rendering pipelines that can be configured to perform various tasks related to generating pixel data from graphics data supplied by CPU 102 and/or system memory 104 via memory bridge 105 and bus 113, interacting with local parallel processing memory 204 (which can be used as graphics memory including, e.g., a conventional frame buffer) to store and update pixel data, delivering pixel data to display device 110, and the like. In some embodiments, parallel processing subsystem 112 may include one or more PPUs 202 that operate as graphics processors and one or more other PPUs 202 that are used for general-purpose computations. The PPUs may be identical or different, and each PPU may have its own dedicated parallel processing memory device(s) or no dedicated parallel processing memory device(s). One or more PPUs 202 may output data to display device 110 or each PPU 202 may output data to one or more display devices 110.

In operation, CPU 102 is the master processor of computer system 100, controlling and coordinating operations of other system components. In particular, CPU 102 issues commands that control the operation of PPUs 202. In some embodiments, CPU 102 writes a stream of commands for each PPU 202 to a pushbuffer (not explicitly shown in either FIG. 1 or FIG. 2) that may be located in system memory 104, parallel processing memory 204, or another storage location accessible to both CPU 102 and PPU 202. PPU 202 reads the command stream from the pushbuffer and then executes commands asynchronously relative to the operation of CPU 102.

Referring back now to FIG. 2, each PPU 202 includes an I/O (input/output) unit 205 that communicates with the rest of computer system 100 via communication path 113, which connects to memory bridge 105 (or, in one alternative embodiment, directly to CPU 102). The connection of PPU 202 to the rest of computer system 100 may also be varied. In some embodiments, parallel processing subsystem 112 is implemented as an add-in card that can be inserted into an expansion slot of computer system 100. In other embodiments, a PPU 202 can be integrated on a single chip with a bus bridge, such as memory bridge 105 or I/O bridge 107. In still other embodiments, some or all elements of PPU 202 may be integrated on a single chip with CPU 102.

In one embodiment, communication path 113 is a PCI-E link, in which dedicated lanes are allocated to each PPU 202, as is known in the art. Other communication paths may also be used. An I/O unit 205 generates packets (or other signals) for transmission on communication path 113 and also receives all incoming packets (or other signals) from communication path 113, directing the incoming packets to appropriate components of PPU 202. For example, commands related to processing tasks may be directed to a host interface 206, while commands related to memory operations (e.g., reading from or writing to parallel processing memory 204) may be directed to a memory crossbar unit 210. Host interface 206 reads each pushbuffer and outputs the work specified by the pushbuffer to a front end 212.

Each PPU 202 advantageously implements a highly parallel processing architecture. As shown in detail, PPU 202(0) includes a processing cluster array 230 that includes a number C of general processing clusters (GPCs) 208, where C≧1. Each GPC 208 is capable of executing a large number (e.g., hundreds or thousands) of threads concurrently, where each thread is an instance of a program. In various applications, different GPCs 208 may be allocated for processing different types of programs or for performing different types of computations. For example, in a graphics application, a first set of GPCs 208 may be allocated to perform tessellation operations and to produce primitive topologies for patches, and a second set of GPCs 208 may be allocated to perform tessellation shading to evaluate patch parameters for the primitive topologies and to determine vertex positions and other per-vertex attributes. The allocation of GPCs 208 may vary dependent on the workload arising for each type of program or computation.

GPCs 208 receive processing tasks to be executed via a work distribution unit 200, which receives commands defining processing tasks from front end unit 212. Processing tasks include indices of data to be processed, e.g., surface (patch) data, primitive data, vertex data, and/or pixel data, as well as state parameters and commands defining how the data is to be processed (e.g., what program is to be executed). Work distribution unit 200 may be configured to fetch the indices corresponding to the tasks, or work distribution unit 200 may receive the indices from front end 212. Front end 212 ensures that GPCs 208 are configured to a valid state before the processing specified by the pushbuffers is initiated.

A work distribution unit 200 may be configured to produce tasks at a frequency capable of providing tasks to multiple GPCs 208 for processing. By contrast, in conventional systems, processing is typically performed by a single processing engine, while the other processing engines remain idle, waiting for the single processing engine to complete its tasks before beginning their processing tasks. In some embodiments of the present invention, portions of GPCs 208 are configured to perform different types of processing. For example a first portion may be configured to perform vertex shading and topology generation, a second portion may be configured to perform tessellation and geometry shading, and a third portion may be configured to perform pixel shading in screen space to produce a rendered image. Intermediate data produced by GPCs 208 may be stored in buffers to allow the intermediate data to be transmitted between GPCs 208 for further processing.

Memory interface 214 includes a number D of partition units 215 that are each directly coupled to a portion of parallel processing memory 204, where $D \geq 1$. As shown, the number of partition units 215 generally equals the number of DRAM 220. In other embodiments, the number of partition units 215 may not equal the number of memory devices. Persons skilled in the art will appreciate that DRAM 220 may be replaced with other suitable storage devices and can be of generally conventional design. A detailed description is therefore omitted. Render targets, such as frame buffers or texture maps may be stored across DRAMs 220, allowing partition units 215 to write portions of each render target in parallel to efficiently use the available bandwidth of parallel processing memory 204.

Any one of GPCs 208 may process data to be written to any of the partition units 215 within parallel processing memory 204. Crossbar unit 210 is configured to route the output of each GPC 208 to the input of any partition unit 214 or to another GPC 208 for further processing. GPCs 208 communicate with memory interface 214 through crossbar unit 210 to read from or write to various external memory devices. In one embodiment, crossbar unit 210 has a connection to memory interface 214 to communicate with I/O unit 205, as well as a connection to local parallel processing memory 204, thereby enabling the processing cores within the different GPCs 208 to communicate with system memory 104 or other memory that is not local to PPU 202. Crossbar unit 210 may use virtual channels to separate traffic streams between the GPCs 208 and partition units 215.

Again, GPCs 208 can be programmed to execute processing tasks relating to a wide variety of applications, including but not limited to, linear and nonlinear data transforms, filtering of video and/or audio data, modeling operations (e.g., applying laws of physics to determine position, velocity and other attributes of objects), image rendering operations (e.g., tessellation shader, vertex shader, geometry shader, and/or pixel shader programs), and so on. PPUs 202 may transfer data from system memory 104 and/or local parallel processing memories 204 into internal (on-chip) memory, process the data, and write result data back to system memory 104 and/or local parallel processing memories 204, where such data can be accessed by other system components, including CPU 102 or another parallel processing subsystem 112.

A PPU 202 may be provided with any amount of local parallel processing memory 204, including no local memory, and may use local memory and system memory in any combination. For instance, a PPU 202 can be a graphics processor in a unified memory architecture (UMA) embodiment. In such embodiments, little or no dedicated graphics (parallel processing) memory would be provided, and PPU 202 would use system memory exclusively or almost exclusively. In UMA embodiments, a PPU 202 may be integrated into a bridge chip or processor chip or provided as a discrete chip with a high-speed link (e.g., PCI-E) connecting the PPU 202 to system memory via a bridge chip or other communication means.

As noted above, any number of PPUs 202 can be included in a parallel processing subsystem 112. For instance, multiple PPUs 202 can be provided on a single add-in card, or multiple add-in cards can be connected to communication path 113, or one or more of PPUs 202 can be integrated into a bridge chip. PPUs 202 in a multi-PPU system may be identical to or different from one another. For instance, different PPUs 202 might have different numbers of processing cores, different amounts of local parallel processing memory, and so on. Where multiple PPUs 202 are present, those PPUs may be operated in parallel to process data at a higher throughput than is possible with a single PPU 202. Systems incorporating one or more PPUs 202 may be implemented in a variety of configurations and form factors, including desktop, laptop, or handheld personal computers, servers, workstations, game consoles, embedded systems, and the like.

Processing Cluster Array Overview

Figure 3A:
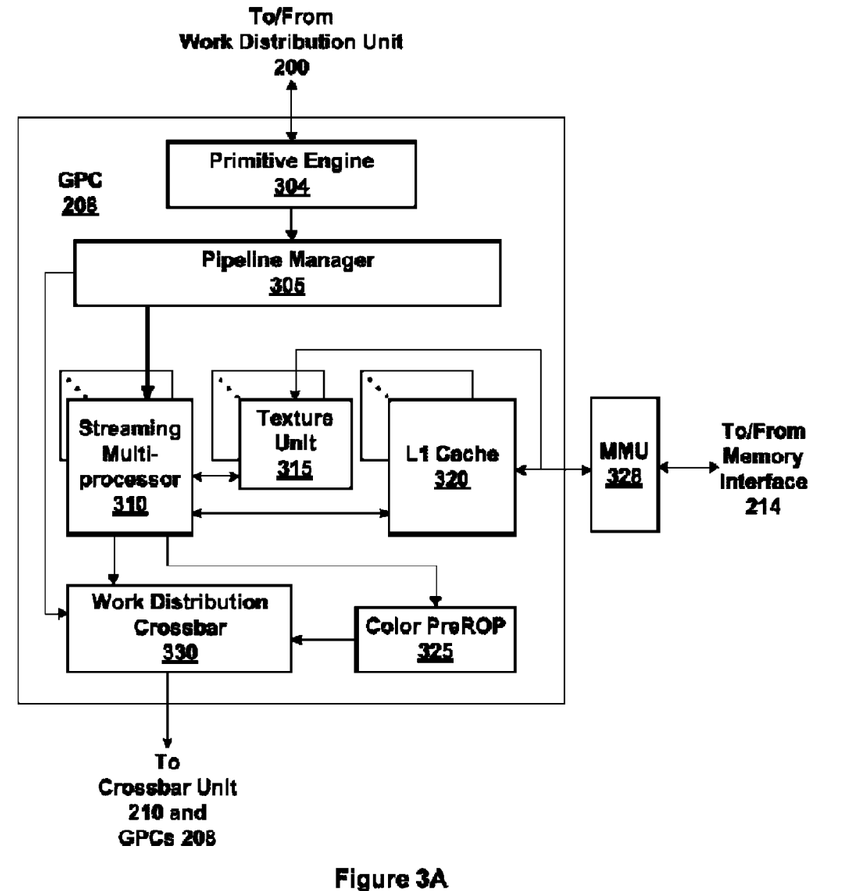
FIG. 3A is a block diagram of a GPC within one of the PPUs of FIG. 2, according to one embodiment of the present invention.

FIG. 3A is a block diagram of a GPC 208 within one of the PPUs 202 of FIG. 2, according to one embodiment of the present invention. Each GPC 208 may be configured to execute a large number of threads in parallel, where the term "thread" refers to an instance of a particular program executing on a particular set of input data. In other embodiments, single-instruction, multiple-data (SIMD) instruction issue techniques are used to support parallel execution of a large number of threads without providing multiple independent instruction units. In other embodiments, single-instruction, multiple-thread (SIMT) techniques are used to support parallel execution of a large number of generally synchronized threads, using a common instruction unit configured to issue instructions to a set of processing engines within each one of the GPCs 208. Unlike a SIMD execution regime, where all processing engines typically execute identical instructions, SIMT execution allows different threads to more readily follow divergent execution paths through a given thread program. Persons skilled in the art will understand that a SIMD processing regime represents a functional subset of a SIMT processing regime.

In graphics applications, a GPU 208 may be configured to implement a primitive engine 304 for performing screen space graphics processing functions that may include, but are not limited to primitive setup, rasterization, and z culling. In some embodiments, primitive engine 304 is configured to gather pixels into tiles of multiple neighboring pixels before outputting the pixels to L1 cache 320 in order to improve the access efficiency of L1 cache 320. Primitive engine 304 receives a processing task from work distribution unit 200, and when the processing task does not require the operations performed by primitive engine 304, the processing task is passed through primitive engine 304 to a pipeline manager 305. Operation of GPC 208 is advantageously controlled via a pipeline manager 305 that distributes processing tasks to streaming multiprocessors (SPMs) 310. Pipeline manager 305 may also be configured to control a work distribution crossbar 330 by specifying destinations for processed data output by SPMs 310.

In one embodiment, each GPC 208 includes a number M of SPMs 310, where M≧1, each SPM 310 configured to process one or more thread groups. Also, each SPM 310 advantageously includes an identical set of functional units (e.g., arithmetic logic units, etc.) that may be pipelined, allowing a new instruction to be issued before a previous instruction has finished, as is known in the art. Any combination of functional units may be provided. In one embodiment, the functional units support a variety of operations including integer and floating point arithmetic (e.g., addition and multiplication), comparison operations, Boolean operations (AND, OR, XOR), bit-shifting, and computation of various algebraic functions (e.g., planar interpolation, trigonometric, exponential, and logarithmic functions, etc.); and the same functional-unit hardware can be leveraged to perform different operations.

The series of instructions transmitted to a particular GPC 208 constitutes a thread, as previously defined herein, and the collection of a certain number of concurrently executing threads across the parallel processing engines (not shown) within an SPM 310 is referred to herein as a "warp" or "thread group." As used herein, a "thread group" refers to a group of threads concurrently executing the same program on different input data, with one thread of the group being assigned to a different processing engine within an SPM 310. A thread group may include fewer threads than the number of processing engines within the SPM 310, in which case some processing engines will be idle during cycles when that thread group is being processed. A thread group may also include more threads than the number of processing engines within the SPM 310, in which case processing will take place over consecutive clock cycles. Since each SPM 310 can support up to G thread groups concurrently, it follows that up to GXM thread groups can be executing in GPC 208 at any given time.

Each SPM 310 uses space in a corresponding L1 cache 320 that is used to perform load and store operations. Each SPM 310 also has access to L2 caches within the partition units 215 that are shared among all GPCs 208 and may be used to transfer data between threads. Finally, SPMs 310 also have access to off-chip "global" memory, which can include, e.g., parallel processing memory 204 and/or system memory 104. It is to be understood that any memory external to PPU 202 may be used as global memory.

In graphics applications, a GPC 208 may be configured such that each SPM 310 is coupled to a texture unit 315 for performing texture mapping operations, e.g., determining texture sample positions, reading texture data, and filtering the texture data. Texture data is read from L1 cache 320 and is fetched from an L2 cache, parallel processing memory 204, or system memory 104, as needed. Each SPM 310 outputs processed tasks to work distribution crossbar 330 in order to provide the processed task to another GPC 208 for further processing or to store the processed task in an L2 cache, parallel processing memory 204, or system memory 104 via crossbar unit 210. A color preROP (pre-raster operations) 325 is configured to perform optimizations for color blending, organize pixel color data, and perform address translations.

It will be appreciated that the core architecture described herein is illustrative and that variations and modifications are possible. Any number of processing engines, e.g., primitive engines 304, SPMs 310, texture units 315, or color preROPs 325 may be included within a GPC 208. Further, while only one GPC 208 is shown, a PPU 202 may include any number of GPCs 208 that are advantageously functionally similar to one another so that execution behavior does not depend on which GPC 208 receives a particular processing task. Further, each GPC 208 advantageously operates independently of other GPCs 208 using separate and distinct processing engines, L1 caches 320, and so on.

Figure 3B:
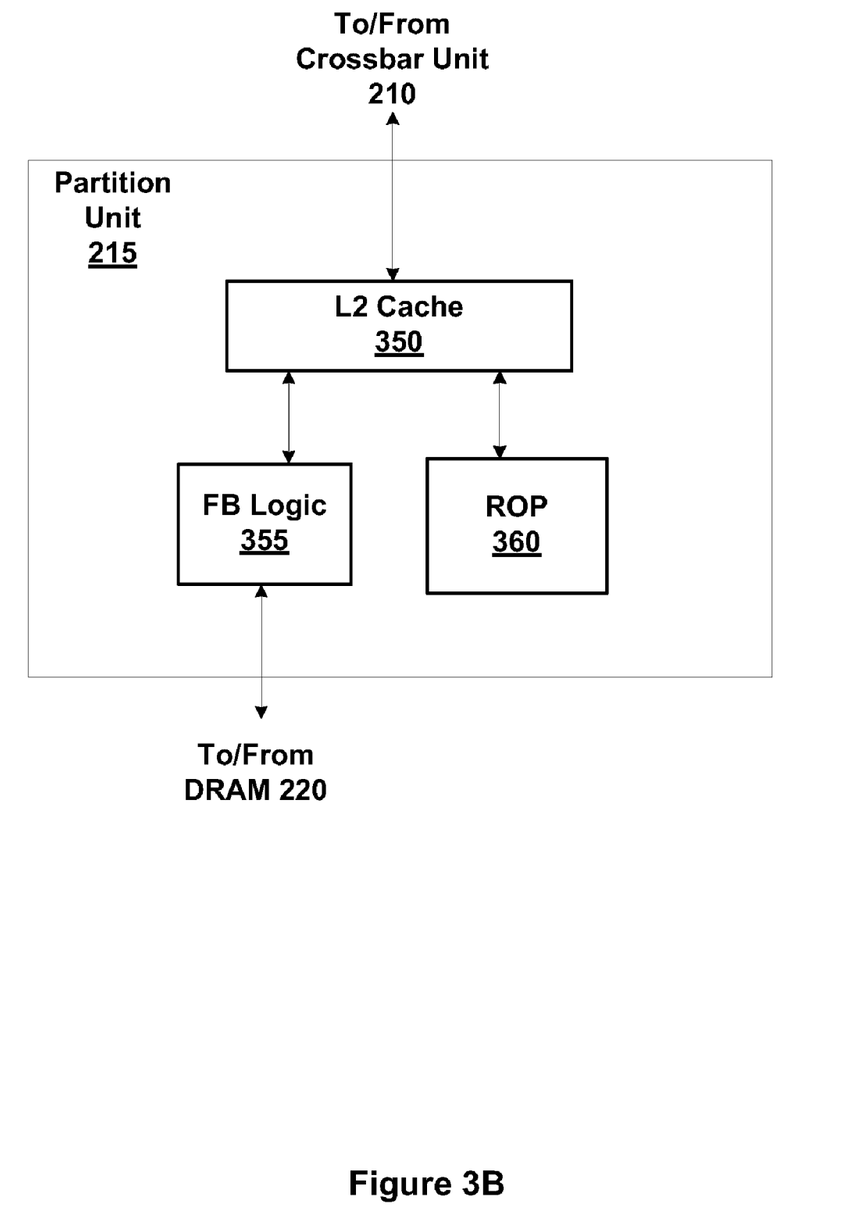
FIG. 3B is a block diagram of a partition unit within one of the PPUs of FIG. 2, according to one embodiment of the present invention.

FIG. 3B is a block diagram of a partition unit 215 within on of the PPUs 202 of FIG. 2, according to one embodiment of the present invention. As shown, partition unit 215 includes a L2 cache 350, a frame buffer logic 355, and a raster operations unit (ROP) 360. L2 cache 350 is a read/write cache that is configured to perform load and store operations received from crossbar unit 210 and ROP 360. In some embodiments, L2 cache 350 may be split into four (or fewer) slices in order to interface with memory crossbar unit 210 at four times the bandwidth of frame buffer logic 355. Read misses and urgent writeback requests are output by L2 cache 350 to frame buffer logic 355 for processing. Dirty updates are also sent to frame buffer logic 355 for opportunistic processing. Frame buffer logic 355 interfaces directly with parallel processing memory 204, outputting read and write requests and receiving data read from parallel processing memory 204.

In graphics applications, ROP 360 is a processing unit that performs raster operations, such as stencil, z test, and the like, and outputs pixel data as processed graphics data for storage in graphics memory. The processed graphics data may be displayed on display device 110 or routed for further processing by CPU 102 or by one of the processing entities within parallel processing subsystem 112. Each partition unit 215 includes a ROP 360 in order to distribute processing of the raster operations. In some embodiments, ROP 360 is configured to compress z or color data that is written to memory and decompress z or color data that is read from memory.

Persons skilled in the art will understand that the architecture described in FIGS. 1, 2, 3A and 3B in no way limits the scope of the present invention and that the techniques taught herein may be implemented on any properly configured processing unit, including, without limitation, one or more CPUs, one or more multi-core CPUs, one or more PPUs 202, one or more GPCs 208, one or more graphics or special purpose processing units, or the like, without departing the scope of the present invention.

Storing Dirty Data in the DRAM

Figure 4:
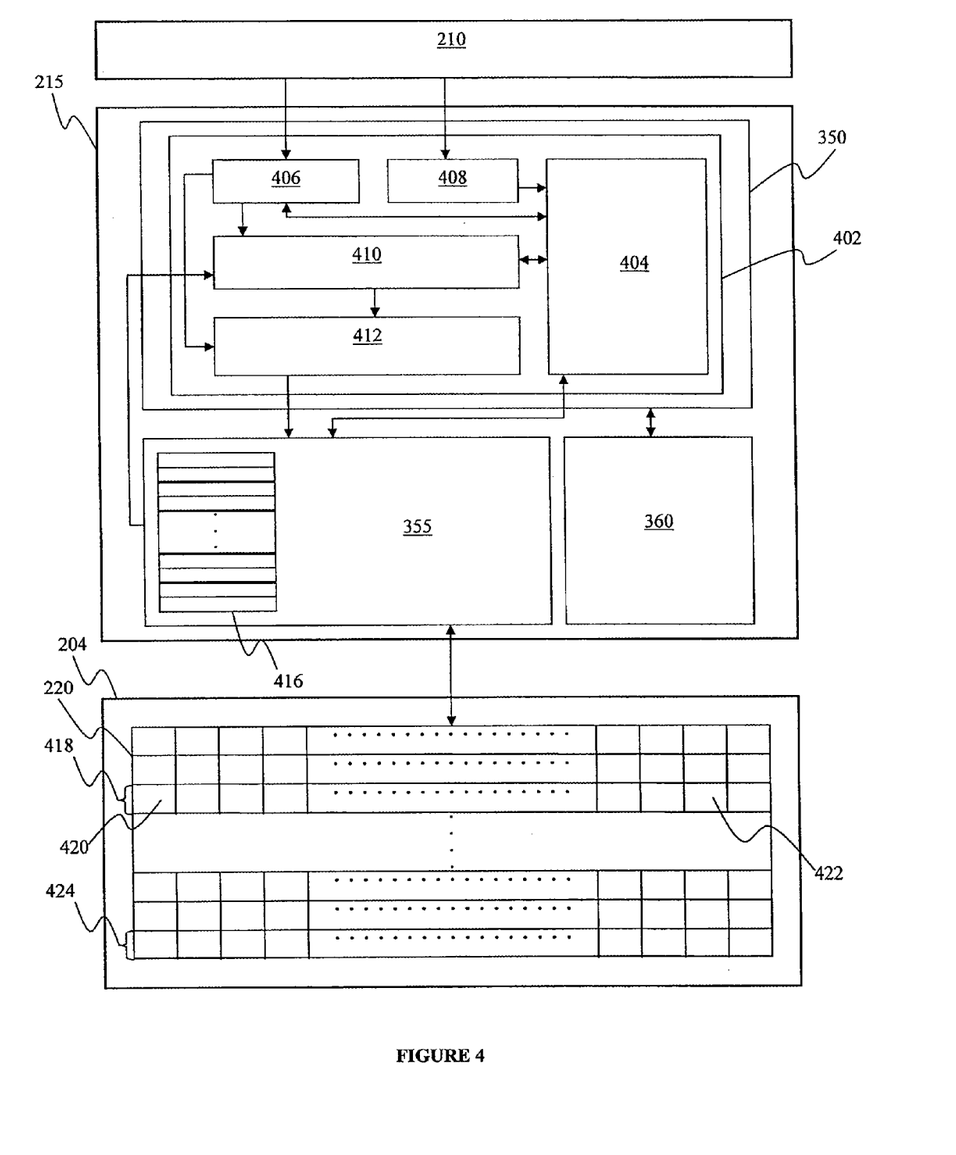
FIG. 4 is a detailed block diagram of the partition unit of FIG. 3B and the DRAM of FIG. 2, according to one embodiment of the present invention.

FIG. 4 is a detailed block diagram of the partition unit 215 of FIG. 3B and the DRAM 220 of FIG. 2, according to one embodiment of the present invention. As shown, the partition unit 215 includes the L2 cache 350, the frame buffer logic 355 and the ROP 360. The L2 cache 350 includes an L2 cache slice 402, which includes a data cache 404, a tag look-up unit 406, a data buffer 408, a data slice scheduler 410 and an L2 cache command-out interface 412. The frame buffer logic 355 includes a page-stream sorter 416.

As described in conjunction with FIG. 3B, the L2 cache 350 may be split into two or more slices for more efficient processing of read and write commands. The L2 cache slice 402 is one such slice of the L2 cache 350. The data cache 404 in the L2 cache slice 402 is a physically-indexed and tagged sixty-four kilobyte set-associative data cache. The data cache 404 is divided into four segments, each segment having thirty-two rows, and each row having sixteen cache lines of thirty-two bytes.

In operation, the L2 cache slice 402 receives read and write commands from the GPCs 208 and the ROP 360. Read and write commands received from the GPCs 208 are transmitted via the crossbar unit 210. In the case of write commands, the data associated with the write command is also transmitted to the L2 cache slice 402. Each read or write command received by the L2 cache slice 402 includes a memory address that is associated with a cache line located in a specific row within the data cache 404, where the data associated with the read or write command is stored. At any given clock cycle, a cache line in the data cache 404 may be available, may include resident data, or may be reserved for operations that are in progress. Cache lines that have resident data associated with a newly-received write command are said to have resident dirty data. Dirty data may not be evicted from the cache line until the dirty data is stored in the DRAM 220, thereby "cleaning" that data.

The tag look-up unit 406 is configured to determine whether the cache line within the data cache 404 associated with the memory address included in the received read or write command is available. In the case of a read command, if the associated cache line is available, then the tag look-up unit 406 is configured to reserve the cache line and transmit the read command to the frame buffer logic 355 for further processing. If the associated cache line is unavailable, then the tag look-up unit 406 is configured to determine whether the data resident in the cache line is the data being requested with the read command. If the data resident in the cache line is the data being requested, then the tag look-up unit 406 transmits the read command to the data slice scheduler 410 for further processing. If the data resident in the cache is not the data being requested, then the tag look-up unit 406 is configured to stall the read command until the associated cache line becomes available. In the case of a write command, if the associated cache line is available, then the tag look-up unit 406 is configured to reserve the associated cache line for the data associated with the write command and transmit the write command to the data slice scheduler 410 for further processing. If the associated cache line is not available, then the tag look-up unit 406 is configured to determine whether the resident data in the associated cache line is dirty data. If the resident data is dirty data, then the tag look-up unit 406 transmits the write command to the data slice scheduler 410 for further processing. If the resident data is not dirty data, then the tag look-up unit 406 is configured to stall the write command until the associated cache line becomes available. The data buffer 408 is configured to temporarily store the data associated with a write command received from the crossbar unit 210 until the data is transmitted to the data cache 404 for storage in a reserved cache line.

In a situation where the number of unavailable cache lines in the specific row within the data cache 404 associated with the read or write command reaches a pre-determined threshold value, the tag look-up unit 406 is configured to transmit a high-priority clean notification to the frame buffer logic 355, via the L2 command-out interface 412. The high priority clean notification is processed by the frame buffer logic 355 and causes the oldest dirty data resident in a cache line in that specific row of the data cache 404 to be transmitted to the DRAM 220 at the earliest possible clock cycle. Transmitting a high-priority clean reduces that the number of read and write commands stalled because of cache line unavailability.

The data slice scheduler 410 is configured to receive read and write commands from the tag look-up unit 406 and the frame buffer logic 355 and to schedule accesses to the data cache 404 to service those commands. In the case of a read command received from the tag look-up unit 406, the data slice scheduler 410 schedules an access to the data cache 404 for the retrieval of the data being requested with the read command. The data being requested is then transmitted to the requesting ROP 360 or GPCs 208, as the case may be. In the case of a write command received from the tag look-up unit 406, the data slice scheduler 410 schedules an access to the data cache 404 to store the data associated with the write command in the reserved cache line within the data cache 404, where the data is transmitted from the data buffer 408 to the data cache 404. If the reserved cache line has existing resident dirty data, then the data associated with the write command over-writes the existing data. The data slice scheduler 410 transmits a dirty data notification to the L2 command-out interface 412. This dirty data notification includes the memory address of the reserved cache line in which the data associated with the write command is stored and indicates that this newly-written data is "dirty."

When scheduling accesses to the data cache 404, the data slice scheduler 410 is configured to give priority to read and write commands transmitted to the frame buffer logic 355 over read and write commands received from tag look-up unit 406. A read command transmitted from the frame buffer logic 355 to the data slice scheduler 410 indicates a request for dirty data resident in the cache line associated with the read command at a particular clock cycle. By giving priority to these types of read commands, the data slice scheduler 410 ensures that dirty data resident in a particular cache line is evicted at the earliest possible clock cycle. Evicting dirty data from the cache line in this fashion makes the cache line available for future read and write commands that are associated with the same cache line. Further, the frame buffer logic 355 is then able to opportunistically transmit the dirty data to the DRAM 220.

A write command transmitted from the frame buffer logic 355 indicates that, at a particular clock cycle, the data being requested from the DRAM 220 should be transmitted and stored in the cache line associated with the write command. The data stored in the data cache 404 by the frame buffer logic 355 at is the data being requested with an in-progress read command received from the ROP 360 or GPCs 208. By giving priority to these types of write commands, the data slice scheduler 410 ensures that the data being requested with a particular read command is transmitted to the requesting ROP 360 or GPCs 208 at the earliest possible clock cycle.

The L2 command-out interface 412 is configured to store dirty data notifications received from the data slice scheduler 410 and high-priority clean notifications received from the tag look-up unit 406. The L2 command-out interface 412 is also configured to transmit the received dirty data notifications and the high-priority clean notifications, in the order the notifications are received, to the frame buffer logic 355.

The frame buffer logic 355 is configured to determine the particular clock cycle at which dirty data resident in a cache line within the data cache 402 is transmitted to the DRAM 220. The frame buffer logic 355 implements the page-stream sorter 416 to organize and prioritize dirty data notifications and high-priority clean notifications received from the L2 command-out interface 412. Organizing and prioritizing dirty data notifications allows the frame buffer logic 355 to transmit dirty data to the DRAM 220 in an efficient manner. The page-stream sorter 416 is a set-associative data storage structure, that is, the structure is divided into sets, and each set is uniquely identified by a set index. In one embodiment, the page-stream sorter 416 includes thirty-two sets and each set includes two entries. Each entry may be affirmatively associated with a particular DRAM page within the DRAM 220. An entry that is affirmatively associated with a particular DRAM bank page includes information regarding the cache lines in the data cache 404 that have resident dirty data waiting to be transmitted to that DRAM bank page.

As also shown in FIG. 4, the DRAM 220 includes a bank page 418 which includes several data blocks, such as data blocks 420 and 422. In one embodiment, the DRAM 220 includes more than two-thousand DRAM bank pages, and each DRAM bank page includes thirty-two data blocks of thirty-two bytes each. Dirty data received from the frame buffer logic 355 is stored in one data block within a particular DRAM bank page, such as the data block 420 within the bank pages 418. The DRAM bank page and the exact data block within that bank page in which dirty data is stored is determined by the frame buffer logic 355, using the memory address associated with the dirty data. The DRAM 220 also includes a bank page 424. The bank pages 418 and 424 may be mapped to the same set within the page-stream sorter 416.

Figure 5:
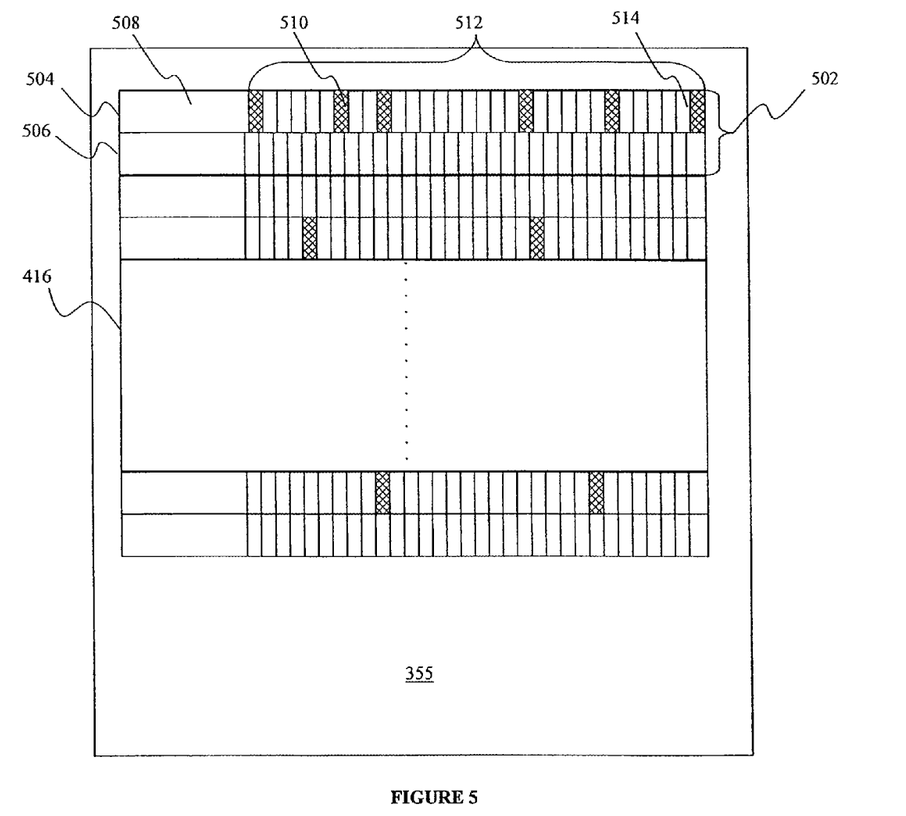
FIG. 5 is a detailed block diagram of the structure of the page-stream sorter of FIG. 4, according to one embodiment of the present invention.

FIG. 5 is a detailed block diagram of the structure of the page-stream sorter 416 of FIG. 4, according to one embodiment of the present invention. As shown, the page-stream sorter 416 includes a set 502 which includes entries 504 and 506. Each entry in a set within the page-stream sorter 416 may be affirmatively associated with one DRAM bank page that maps to that set, such that, at any given clock cycle, a maximum of sixty-four DRAM bank pages may be tracked by the page-stream sorter 416. Each DRAM bank page in the DRAM 220 maps to only one set within the page-stream sorter 416.

For purposes of discussion only, it is assumed that the entry 504 is affirmatively associated with the bank page 418 and includes a tag 508 and thirty-two bits 512. The tag 508 uniquely identifies the bank page 418, and each of the thirty-two bits 512 reflects one of the thirty-two data blocks within the bank page 418. A valid bit, such as bit 510, indicates the presence of dirty data in a cache line within the data cache 404 that should be stored in the data block 420 within the bank page 418. An invalid bit, such as bit 514, indicates that the data cache 404 does not have resident dirty data that should be stored in the data block 422 within the bank page 418. As indicated by the complete absence of valid bits, the entry 506 is available and may be affirmatively associated with a different DRAM bank page that maps to the set 502, such as bank page 424, at a future clock cycle.

Figure 6:
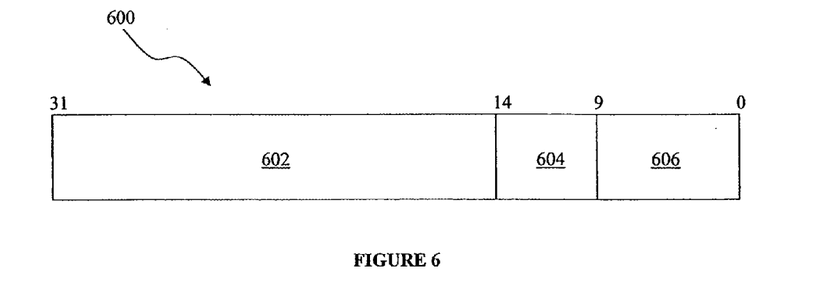
FIG. 6 is a block diagram illustrating the portions of a memory address associated with a dirty data notification, according to one embodiment of the present invention.

FIG. 6 is a block diagram illustrating the portions of a memory address 600 associated with a dirty data notification, according to one embodiment of the present invention. As shown, the memory address 600 includes a first portion 602, which includes the most significant bits of the memory address, a second portion 604 and a third portion 606, which includes the least significant bits of the memory address. The memory address 600 is a thirty-two bit memory address included in a dirty data notification received by the frame buffer logic 355 from the L2 command-out interface 412.

When the frame buffer logic receives a dirty data notification from the data slice scheduler 410, the frame buffer logic analyzes the memory address 600 included in the dirty data notification to extract three pieces of information. The first portion 602 of the memory address 600 indicates the specific DRAM bank page in which the dirty data should be stored. The third portion 606 of the memory address 600 indicates the data block within the DRAM bank page in which the dirty data should be stored and is associated with a single bit within the thirty-two bits in an entry in the page-stream sorter 416. The middle portion 602 of the memory address 600 indicates the set index within the page-stream sorter 416 that should include the entry corresponding to the DRAM bank page identified by the first portion 602. The frame buffer logic 355 then retrieves the entries that are within the set identified by the second portion 604 of the memory address 600. For purposes of discussion only, it is assumed that the set identified by the second portion 604 is the set 502, of FIG. 5, within the page stream sorter 416. The frame buffer logic 355 then compares the tags of the entries retrieved from the set 502 with the first portion 602 of the memory address 600.

In the case that the first portion 602 of the memory address 600 matches the tag 508 of the entry 504 that is affirmatively associated with the bank page 418 within the DRAM 220, the frame buffer logic 355 marks one bit in the thirty-two bits 512 reflected by the third portion 606 of the memory address 600 in the entry 504 as valid. The newly-marked valid bit indicates the presence of dirty data in the data cache 404 that should be stored in the data block within the bank page 418 corresponding to the newly-marked valid bit. In the case that the first portion 602 of the memory address 600 does not match the tag 508, the entry 506 included in the set 502 is affirmatively associated with the DRAM bank page within the DRAM 220 associated with the first portion 602. For purposes of discussion only, it is assumed that the first portion 602 of the memory address 600 is associated with the bank page 424 within the DRAM 220. The frame buffer logic 355 marks one bit in the thirty-two bits 512 reflected by the third portion 606 of the memory address 600 as valid. The newly-marked valid bit indicates the presence of dirty data in the data cache 404 that should be stored in the data block within the bank page 424 corresponding to the valid bit in the entry 506.

Upon marking a bit in a particular entry as valid, the frame buffer logic 355 determines if the total number of valid bits in that entry is equal to a pre-determined threshold value. If so, then the frame buffer logic 355 transmits read commands to the data slice scheduler 412 requesting the dirty data associated with each of the valid bits in the entry. The frame buffer logic 355 transmits the clock cycle at which the dirty data is being requested to the data slice scheduler 412 as well. As described in conjunction with FIG. 4, the data slice scheduler 412 gives the highest priority to read and write commands received from the frame buffer logic 355 and, therefore, proceeds to schedule the transmission of the requested dirty data at the specified clock cycle. Upon receiving the requested dirty data from the data cache 404 at the specified clock cycle, the frame buffer logic 355 transmits the dirty data to the specific data blocks within the DRAM bank page corresponding to the entry for storage. Once all of the dirty data associated with the entry is written to the DRAM bank page corresponding to the entry, the frame buffer logic then disassociates the entry from that particular DRAM bank page and the entry may be affirmatively associated with another DRAM bank page at a future clock cycle.

If the number of valid bits in an entry is less than a pre-determined threshold value, then the frame buffer logic determines if the number of affirmatively associated entries in a set is greater than a certain threshold. If so, then the frame buffer logic 355 transmits read commands for the dirty data associated with each of the valid bits in the older entry in the set to the data slice scheduler 412. The frame buffer logic 355 also transmits the clock cycle at which the dirty data is requested. The dirty data received from the data cache 404 associated with the older entry in the set is transmitted to the DRAM bank page associated with the entry for storage. The frame buffer logic then disassociates the older entry from the DRAM bank page and the older entry may be affirmatively associated at a future clock cycle. This approach ensures that there is space availability in each set in the page-stream sorter 416 for a different DRAM bank page that may be associated with that set.

As described in conjunction with FIG. 4, the tag look-up unit 418 may transmit a high-priority clean notification if the number of cache lines in a specific row in the data cache 404 with resident dirty data is equal to a pre-determined threshold. This high-priority clean notification includes the memory address of a cache line within the specific row with the oldest resident dirty data. The frame buffer logic 355 analyzes the memory address included in the high-priority clean notification, as previously described. If an affirmatively associated entry corresponding to the most significant portion of the memory address exists in the page-stream sorter 416, then the frame buffer logic 355 marks the bit corresponding to the least significant portion of the memory address within the affirmatively associated entry as valid. If an affirmatively associated entry corresponding to the most significant portion of the memory address does not exist, then the frame buffer logic 355 affirmatively associates an available entry within the set with the DRAM bank page corresponding to the most significant portion of the memory address. The frame buffer logic 355 marks the bit corresponding to the least significant portion of the memory address within the newly affirmatively associated entry as valid.

The frame buffer logic 355 then transmits read commands for the dirty data associated with each of the valid bits in the affirmatively associated entry that has a valid bit resulting from a high-priority clean notification to the data slice scheduler 412. The frame buffer logic 355 also transmits the clock cycle at which the dirty data is requested. The frame buffer logic receives the dirty data from the each of the cache lines associated with the valid bits within the affirmatively associated entry from the data cache 404. The dirty data is transmitted to the corresponding data blocks within the DRAM bank page associated with the affirmatively associated entry. The frame buffer logic then disassociates the affirmatively associated entry from the DRAM bank page.

Figure 7A:
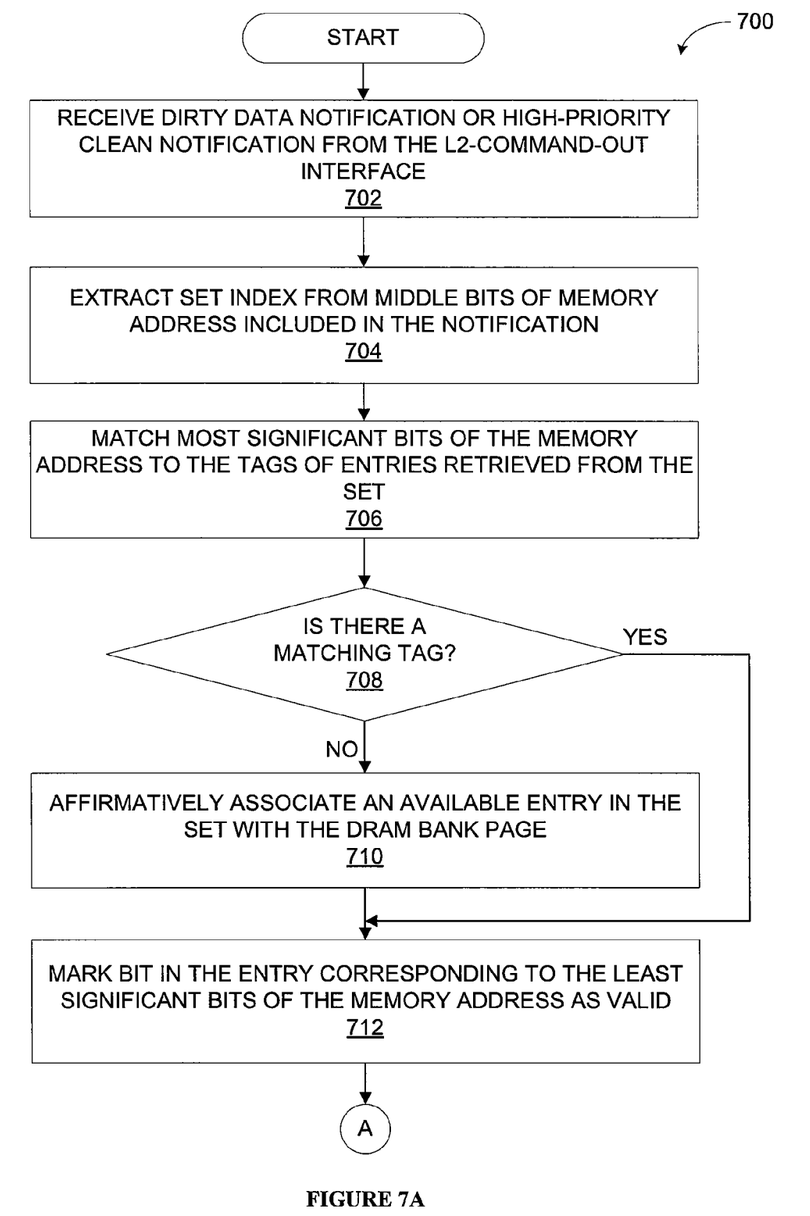
FIGS. 7A, 7B and 7C set forth a flow diagram of method steps for determining when to retrieve dirty data resident in the data cache of the L2 slice for storage in the parallel processing memory, according to one embodiment of the present invention.
Figure 7B:
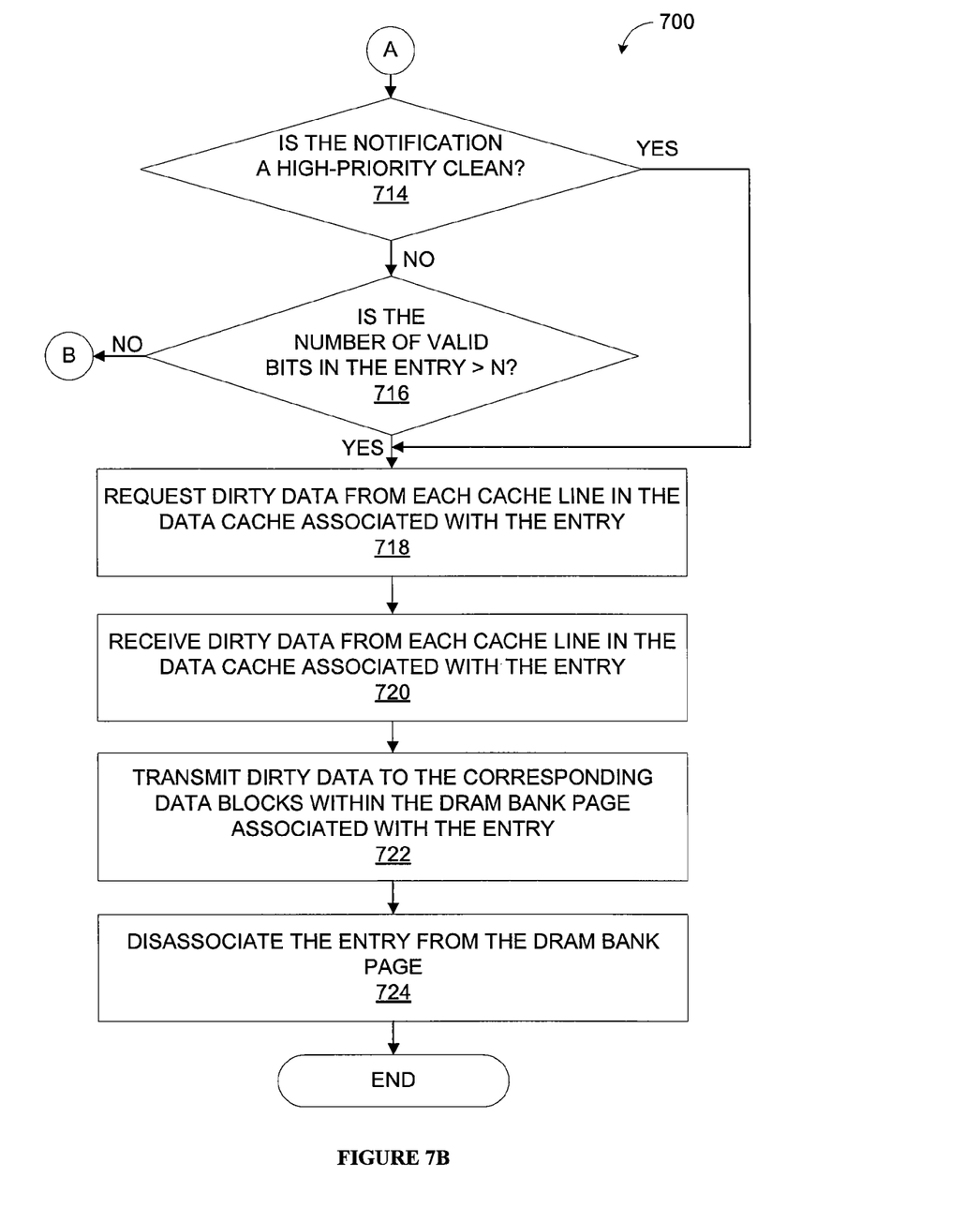
Figure 7C:
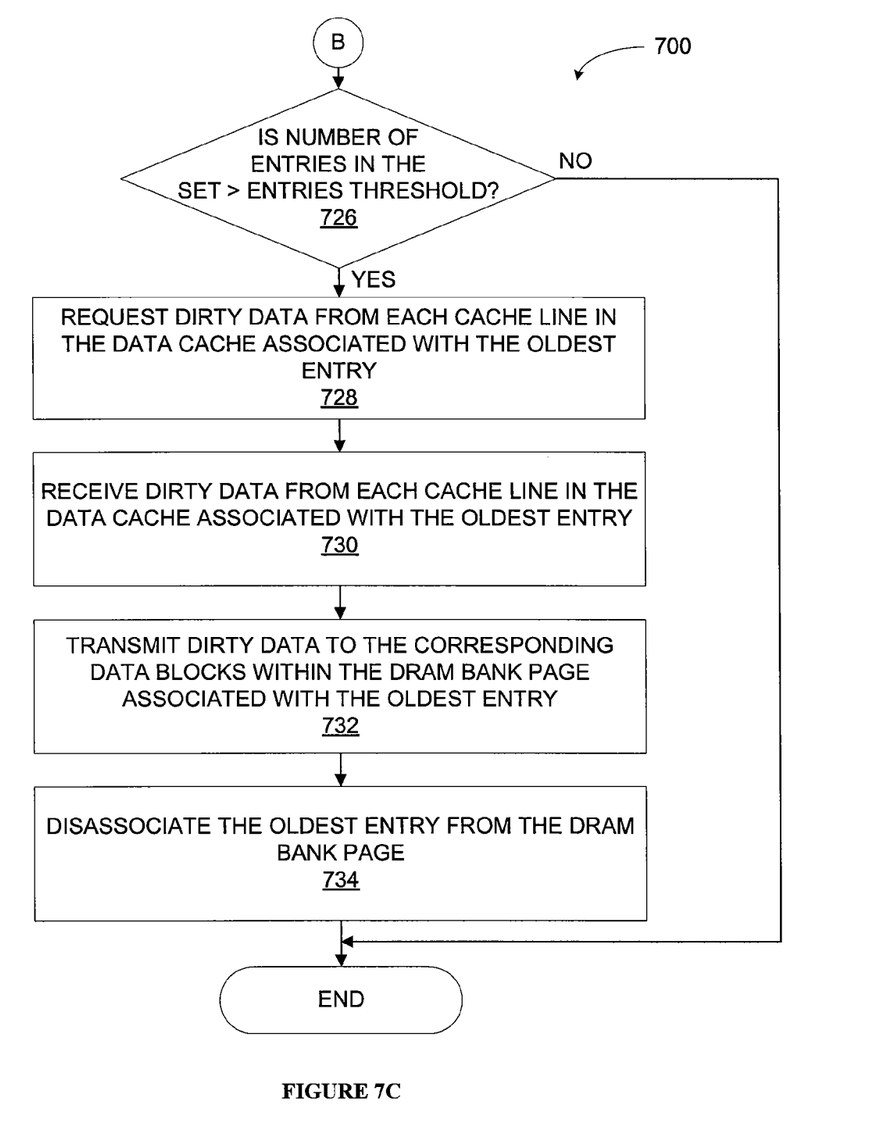

FIGS. 7A, 7B and 7C set forth a flow diagram of method steps for determining when to retrieve dirty data resident in the data cache of the L2 slice for storage in the parallel processing memory, according to one embodiment of the present invention. Although the method steps are described in conjunction with the systems for FIGS. 1-6, persons skilled in the art will understand that any system configured to perform the method steps, in any order, is within the scope of the invention.

The method 700 begins at step 702 where a dirty data notification or a high-priority clean notification is transmitted to the frame buffer logic 355 from the L2 command-out interface 412. The dirty data notification or the high-priority clean notification includes a memory address associated with the dirty data resident in a cache line in the data cache 404. At step 704, the frame buffer logic 355 extracts the set index associated with the memory address from the middle five bits of the memory address. At step 706, the frame buffer logic 355 retrieves the entries within the set associated with the extracted set index in the page-stream sorter 416. The frame buffer logic 355 then matches the most significant seventeen bits of the memory address with the tags of the affirmatively associated entries within the set.

At step 708, the frame buffer logic 355 determines whether the most significant seventeen bits of the memory address match with the tag included in an affirmatively associated entry in the set. If the frame buffer logic 355 determines that the most significant seventeen bits of the memory address do not match with the tag included in any of the affirmatively associated entries in the set, then the method proceeds to step 710. At step 710, an available entry in the set is affirmatively associated with the DRAM bank page that is associated with the memory address. The tag of the affirmatively associated entry is set to the most significant seventeen bits of the memory address. At step 712, the bit that reflects the data block associated with the least significant ten bits of the memory address within the thirty-two bits in the affirmatively associated entry is marked as valid. Referring back now to step 708, if the most significant seventeen bits of the memory address match with the tag of an affirmatively associated entry included in the set, then the method 700 proceeds directly to the step 712.

At step 714, the frame buffer logic 355 determines whether the notification transmitted by the L2 command-out interface 412 is a high-priority clean notification or a dirty data notification. If the frame buffer logic determines that the notification is a high-priority clean notification, then the method 700 proceeds to step 718. At step 718, the frame buffer logic 355 transmits read commands to the data slice scheduler 410 requesting dirty data associated with the valid bits in the affirmatively associated entry at a particular clock cycle. The read commands transmitted from the frame buffer logic 355 include the memory addresses of the cache lines in the data cache 404 that have resident dirty data associated with the valid bits in the affirmatively associated entry. At step 720, the frame buffer logic 355 receives the dirty data from each cache line in the data cache 404 that is associated with the valid bits in the affirmatively associated entry. At step 722, the frame buffer logic 355 transmits the dirty data received from the cache lines within the data cache 404 to the corresponding data blocks within the DRAM bank page associated with the affirmatively associated entry. At step 724, the frame buffer logic 355 disassociates the affirmatively associated entry in the set with the particular DRAM bank page and the method 700 ends. The disassociated entry may be affirmatively associated with a DRAM bank page at a future clock cycle.

Referring back now to step 714, if the frame buffer logic 355 determines that the notification is a dirty data notification then, the method 700 proceeds to step 716. At step 716, the frame buffer logic 355 determines whether the total number of valid bits in the affirmatively associated entry associated with the dirty data notification is greater than a pre-determined threshold value. If the total number of valid bits in the affirmatively associated entry is greater than the pre-determined threshold, then the method 700 proceeds to step 718. If, however, the frame buffer logic determines that the total number of valid bits in the affirmatively associated entry is less than or equal to a pre-determined threshold value, then the method 700 proceeds directly to step 726.

At step 726, the frame buffer logic 355 determines whether the number of affirmatively associated entries in the set within the page-stream sorter 416 that is associated with the memory address included in the notification is greater than a threshold of entries per set. If the frame buffer logic 355 determines that the number of affirmatively associated entries in the set is greater than threshold of entries per set, then the method step proceeds to step 728. At step 728, the frame buffer logic 355 transmits read commands to the data slice scheduler 410 requesting dirty data associated with the valid bits in the oldest affirmatively associated entry in the set at a particular clock cycle. The read commands transmitted from the frame buffer logic 355 include the memory addresses of the cache lines in the data cache 404 that have resident dirty data associated with the valid bits in the oldest affirmatively associated entry. At step 730, the frame buffer logic 355 receives the dirty data from each cache line in the data cache 404 that is associated with the valid bits in the oldest affirmatively associated entry. At step 732, the frame buffer logic 355 transmits the dirty data received from the cache lines within the data cache 404 to the corresponding data blocks within the DRAM bank page associated with the oldest affirmatively associated entry. At step 734, the frame buffer logic 355 disassociates the oldest affirmatively associated entry in the set with the particular DRAM bank page and the method 700 ends. The disassociated entry may be affirmatively associated with a DRAM bank page at a future clock cycle.

Importantly, the value of the threshold of entries per set is typically less than the total number of entries per set to allow for the latency between determining when to clean dirty data and disassociating an entry in the page-stream sorter 416 associated with the cleaned data. Further, the threshold of entries per set ensures that there are available entries within each set of the page-stream sorter 416 so that the data cache 404 is not stalled when transmitting dirty data notifications to the frame buffer logic 355. The threshold of entries per set also triggers the cleaning of dirty data in the data cache 404 in a timely fashion even if the dirty threshold for a particular entry is not reached.

Referring back now to step 726, if the frame buffer logic 355 determines that the number of affirmatively associated entries in the set is less than or equal to threshold of entries per set, then the method 700 ends.

In sum, the frame buffer logic determines when to request resident dirty data from the data cache of an L2 cache slice for transmission to the DRAM memory. The frame buffer logic includes a page-stream sorter that keeps track of dirty data resident in the data cache that needs to be written to the different DRAM bank pages in the off-chip memory. The page-stream sorter is divided into thirty-two sets, each set including a maximum of two entries associated with two different DRAM bank pages. Any given entry in the page-stream sorter includes a tag number indicating the DRAM bank page and thirty-two bits reflecting thirty-two data blocks included in the associated DRAM bank page in which dirty data may be written. Each DRAM bank page is mapped to only one set within the page-stream sorter.

When dirty data is stored in the L2 slice data cache in the L2 cache slice, the data slice scheduler transmits a dirty data notification to the frame buffer logic. The dirty data notification includes a thirty-two bit memory address of a location within a DRAM bank page where the dirty data should be stored. The frame buffer logic analyzes the memory address included in the dirty data notification to extract three pieces of information. The most significant seventeen bits of the memory address indicate the specific DRAM bank page in which the dirty data should be stored. The ten least significant bits of the memory address indicate the data block within the DRAM bank page in which the dirty data should be stored. The middle five bits of the memory address indicate the set index within the page-stream sorter that should include the entry corresponding to the particular data block within that DRAM bank page in which the dirty data should be stored. If the set of DRAM bank pages corresponding to the set index derived from the memory address includes the specific SRAM banks in which the dirty data should be stored, then the bit in the entry is marked as valid. The valid bit indicates that there is dirty data waiting to be written to that specific data block in the DRAM bank page. However, if the set of DRAM bank pages corresponding to the set index derived from the memory address does not include the specific DRAM bank page in which the dirty data should be stored, a new entry for the DRAM bank page is created and the bit within the entry is marked valid. The frame buffer logic automatically transmits data waiting to be written to a particular DRAM bank page when the number of valid bits in a particular entry reaches a pre-determined threshold value. In addition, once each of the entries corresponding to a given set is affirmatively associated with a DRAM bank page, the frame buffer logic is configured to automatically transmit the dirty data associated with the older of the two entries to the DRAM bank associated with that entry.

Advantageously, the number and duration of halted read and write operations is minimized as the frame buffer logic automatically transmits dirty data associated with a particular bank page when the number of cache lines with resident dirty data associated with that bank page reaches a pre-determined threshold value. In addition, transmitting the dirty data associated with an older entry to the DRAM bank page, when each entry in a set becomes affirmatively associated, ensures space availability in the particular set for a different DRAM bank page that may map to that set.

While the foregoing is directed to embodiments of the present invention, other and further embodiments of the invention may be devised without departing from the basic scope thereof. For example, aspects of the present invention may be implemented in hardware or software or in a combination of hardware and software. One embodiment of the invention may be implemented as a program product for use with a computer system. The program(s) of the program product define functions of the embodiments (including the methods described herein) and can be contained on a variety of computer-readable storage media. Illustrative computer-readable storage media include, but are not limited to: (i) non-writable storage media (e.g., read-only memory devices within a computer such as CD-ROM disks readable by a CD-ROM drive, flash memory, ROM chips or any type of solid-state non-volatile semiconductor memory) on which information is permanently stored; and (ii) writable storage media (e.g., floppy disks within a diskette drive or hard-disk drive or any type of solid-state random-access semiconductor memory) on which alterable information is stored. Such computer-readable storage media, when carrying computer-readable instructions that direct the functions of the present invention, are embodiments of the present invention. Therefore, the scope of the present invention is determined by the claims that follow.

We claim:

1. A method for cleaning dirty data residing in an intermediary cache that is coupled to one or more clients and to an external memory, the method comprising:

receiving a dirty data notification from the intermediate cache that includes a memory address indicating a cache line within the intermediary cache in which dirty data associated with the dirty data notification resides;

determining a set of entries associated with the dirty data notification, wherein each entry in the set of entries corresponds to a different bank page within the external memory;

determining a first entry within the set of entries corresponding to a first bank page within the external memory where the dirty data associated with the dirty data notification should be stored;

marking a bit in the first entry as valid;

requesting dirty data from the intermediary cache associated with either the first entry or another entry within the set of entries for transmission to the external memory; and transmitting the requested dirty data to the external memory for storage.

2. The method of claim 1, wherein the step of determining a first entry is based on a first portion of the memory address, the step of determining a set of entries is based on a second portion of the memory address, and a third portion of the memory address indicates a block within the first bank page within the external memory where the dirty data associated with the dirty data notification should be stored, the block corresponding to the bit in the first entry to be marked.

3. The method of claim 2, wherein the first portion comprises a set of most significant bits within the memory address, the second portion comprises a set of middle bits within the memory address, and the third portion comprises a set of least significant bits within the memory address.

4. The method of claim 2, wherein the step of determining a first entry comprises determining whether the first portion of the memory address matches a tag of an entry already associated with the set of entries.

5. The method of claim 4, wherein the step of determining a first entry further comprises affirmatively associating an available entry within the set of entries with the first bank within the external memory where the dirty data associated with the dirty data notification should be stored.

6. The method of claim 1, further comprising the step of determining that the number of entries within the set of entries is greater than a threshold value.

7. The method of claim 6, wherein the step of requesting dirty data comprises requesting dirty data from each cache line within the intermediary cache associated with a valid bit in an oldest entry within the set of entries, and the step of transmitting the requested dirty data comprises transmitting the dirty data from each of the cache lines to a corresponding block within the bank page within the external memory corresponding to the oldest entry.

8. The method of claim 6, further comprising the step of determining that the dirty data notification is a high-priority clean notification.

9. The method of claim 8, wherein the step of requesting dirty data comprises requesting dirty data from each cache line within the intermediary cache associated with a valid bit in the first entry, and the step of transmitting the requested dirty data comprises transmitting the dirty data from each of the cache lines to a corresponding block with the first bank page within the external memory.

10. The method of claim 9, wherein further comprising the step of determining that the number of valid bits in the first entry is greater than a threshold value.

11. A system configured to clean dirty data residing in an intermediary cache that is coupled to one or more clients and to an external memory, the system comprising:
a data cache; and
memory logic associated with the external memory and coupled to the data cache,
wherein the memory logic includes a page stream sorter configured with one or more sets of bank pages, each set of entries being associated with a plurality of entries, and
wherein the memory logic is configured to:
receive a dirty data notification that includes a memory address indicating a cache line within the data cache in which dirty data associated with the dirty data notification resides;
determine a first set of entries associated with the dirty data notification, wherein each entry in the set of entries corresponds to a different bank page within the external memory;
determine a first entry within the first set of entries corresponding to a first bank page within the external memory where the dirty data associated with the dirty data notification should be stored;
marking a bit in the first entry as valid;
requesting dirty data from the data cache associated with either the first entry or another entry within the first set of entries for transmission to the external memory; and
transmitting the requested dirty data to the external memory for storage.

12. The system of claim 11, wherein the memory logic is configured to determine a first entry based on a first portion of the memory address, to determine a first set of entries based on a second portion of the memory address, and a third portion of the memory address indicates a block within the first bank page within the external memory where the dirty data associated with the dirty data notification should be stored, the block corresponding to the bit in the first entry to be marked.

13. The system of claim 12, wherein the first portion comprises a set of most significant bits within the memory address, the second portion comprises a set of middle bits within the memory address, and the third portion comprises a set of least significant bits within the memory address.

14. The system of claim 12, wherein the memory logic is configured to determine a first entry by determining that the first portion of the memory address does not match a tag of an entry already associated with the first set of entries, and affirmatively associating an available entry within the first set of entries with the first bank within the external memory where the dirty data associated with the dirty data notification should be stored.

15. The system of claim 11, wherein the memory logic is further configured to determine that the number of entries within the first set of entries is greater than a threshold value.

16. The system of claim 15, wherein the memory logic is configured to request dirty data by requesting dirty data from each cache line within the intermediary cache associated with a valid bit in an oldest entry within the set of entries, and the memory logic is configured to transmit the requested dirty data by transmitting the dirty data from each of the cache lines to a corresponding block within the bank page within the external memory corresponding to the oldest entry.

17. The system of claim 11, wherein the memory logic is further configured to determine that the dirty data notification is a high-priority clean notification.

18. The system of claim 17, wherein the memory logic is configured to request dirty data by requesting dirty data from each cache line within the intermediary cache associated with a valid bit in the first entry, and the memory logic is configured to transmit the requested dirty data by transmitting the dirty data from each of the cache lines to a corresponding block with the first bank page within the external memory.

19. The system of claim 18, wherein the memory logic is further configured to determine that the number of valid bits in the first entry is greater than a threshold value.

20. A computing device, comprising:
one or more clients;
a cross bar unit;
a memory partition coupled to the one or more clients via the cross bar unit and including an intermediary cache and memory logic; and
an external memory coupled to the memory partition and associated with the memory logic,
wherein the memory logic includes a page stream sorter configured with one or more sets of bank pages, each set of entries being associated with a plurality of entries, the memory logic being configured to:

receive a dirty data notification from the intermediary cache that includes a memory address indicating a cache line within the intermediary cache in which dirty data associated with the dirty data notification resides, determine a first set of entries associated with the dirty data notification, wherein each entry in the set of entries corresponds to a different bank page within the external memory, determine a first entry within the first set of entries corresponding to a first bank page within the external memory where the dirty data associated with the dirty data notification should be stored, marking a bit in the first entry as valid, requesting dirty data from the intermediary cache associated with either the first entry or another entry within the first set of entries for transmission to the external memory, and transmitting the requested dirty data to the external memory for storage.

* * * * *